(12) United States Patent
Festa et al.

(10) Patent No.: US 11,206,268 B2
(45) Date of Patent: Dec. 21, 2021

(54) ACCOUNT LIFECYCLE MANAGEMENT

(71) Applicant: JPMorgan Chase Bank, N.A., New York, NY (US)

(72) Inventors: Christopher Festa, Jersey City, NJ (US); Jody Spearing, Jersey City, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 276 days.

(21) Appl. No.: 16/224,038

(22) Filed: Dec. 18, 2018

(65) Prior Publication Data

US 2020/0195651 A1 Jun. 18, 2020

(51) Int. Cl.
*G06F 21/00* (2013.01)
*H04L 29/06* (2006.01)
*G06F 21/60* (2013.01)

(52) U.S. Cl.
CPC .......... *H04L 63/102* (2013.01); *G06F 21/604* (2013.01); *H04L 63/101* (2013.01); *H04L 63/105* (2013.01)

(58) Field of Classification Search
CPC ......... G06F 21/6218; G06F 2221/2141; G06F 16/27; G06F 16/13; G06F 16/137; G06F 21/51; G06F 21/604; H04L 63/102; H04L 63/10; H04L 63/101; H04L 63/105
See application file for complete search history.

(56) References Cited

U.S. PATENT DOCUMENTS

| | | | | |
|---|---|---|---|---|
| 10,230,734 | B2* | 3/2019 | Seigel | H04L 63/104 |
| 2004/0006706 | A1* | 1/2004 | Erlingsson | G06F 21/53 |
| | | | | 726/30 |
| 2007/0233600 | A1* | 10/2007 | McMahon | G06Q 10/06 |
| | | | | 705/51 |
| 2012/0102543 | A1* | 4/2012 | Kohli | H04L 63/20 |
| | | | | 726/1 |
| 2014/0201824 | A1* | 7/2014 | Agbabian | H04L 63/08 |
| | | | | 726/6 |
| 2014/0282851 | A1* | 9/2014 | Miller | H04L 63/102 |
| | | | | 726/1 |
| 2014/0298423 | A1 | 10/2014 | Moloian et al. | |
| 2014/0359692 | A1* | 12/2014 | Chari | H04L 63/20 |
| | | | | 726/1 |
| 2015/0156202 | A1* | 6/2015 | Clark | G06F 21/604 |
| | | | | 726/4 |

OTHER PUBLICATIONS

ISR and Written Opinion of Int'l Search Authority issued in WO Patent App. No. PCT/US2019/066939, dated Mar. 9, 2020.

* cited by examiner

*Primary Examiner* — Ghazal B Shehni
(74) *Attorney, Agent, or Firm* — Greenblum & Bernstein, P.L.C.

(57) ABSTRACT

An account lifecycle management system is provided. The system includes a discovery engine configured to discover and identify an account. The system further includes a policy engine configured to identify privileged access data granted to the account identified by the discovery engine. The system further includes a data modeling engine configured to associate the identified privileged access data with organizational information. The system further includes a remediation engine configured to remediate the account based on the associated privileged access data.

20 Claims, 4 Drawing Sheets

ACCOUNT LIFECYCLE MANAGEMENT

TECHNICAL FIELD

The present disclosure generally relates to systems and methods for management of user account access privileges within an organization's technical infrastructure.

BACKGROUND

In large-scale corporate environments, managing user access to corporate technology infrastructure is often burdensome and time consuming. It may take system administrators several days to update or modify user access. This delay may expose the corporation to internal security threats and lead to inefficiencies and system failures during a response to a security threat. In some industries, regulations such as Sarbanes Oxley/Statement on Standards for Attestation Engagement 16 (SOX/SSAE 16) require a regular audit of accounts and account access within the organization. This audit can be both difficult to implement and time consuming.

It is therefore appreciated that a need exists for improved systems and methods for managing user account access.

SUMMARY

In an exemplary embodiment, an account lifecycle management system is provided. The system includes a discovery engine configured to discover and identify an account. The system further includes a policy engine configured to identify privileged access data granted to the account identified by the discovery engine. The system further includes a data modeling engine configured to associate the identified privileged access data with organizational information. The system further includes a remediation engine configured to remediate the account based on the associated privileged access data. In some embodiments, the system further includes a mitigation engine configured to mitigate the account based on the associated privileged access data.

In another exemplary embodiment, a method for account lifecycle management is provided. The method includes identifying an account, identifying privileged access data granted to the account, and associating the privileged access data with organizational information. The method further includes remediating the account based on the associated privileged access data.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but rather as being provided for further explanation and understanding only.

Figure 1:
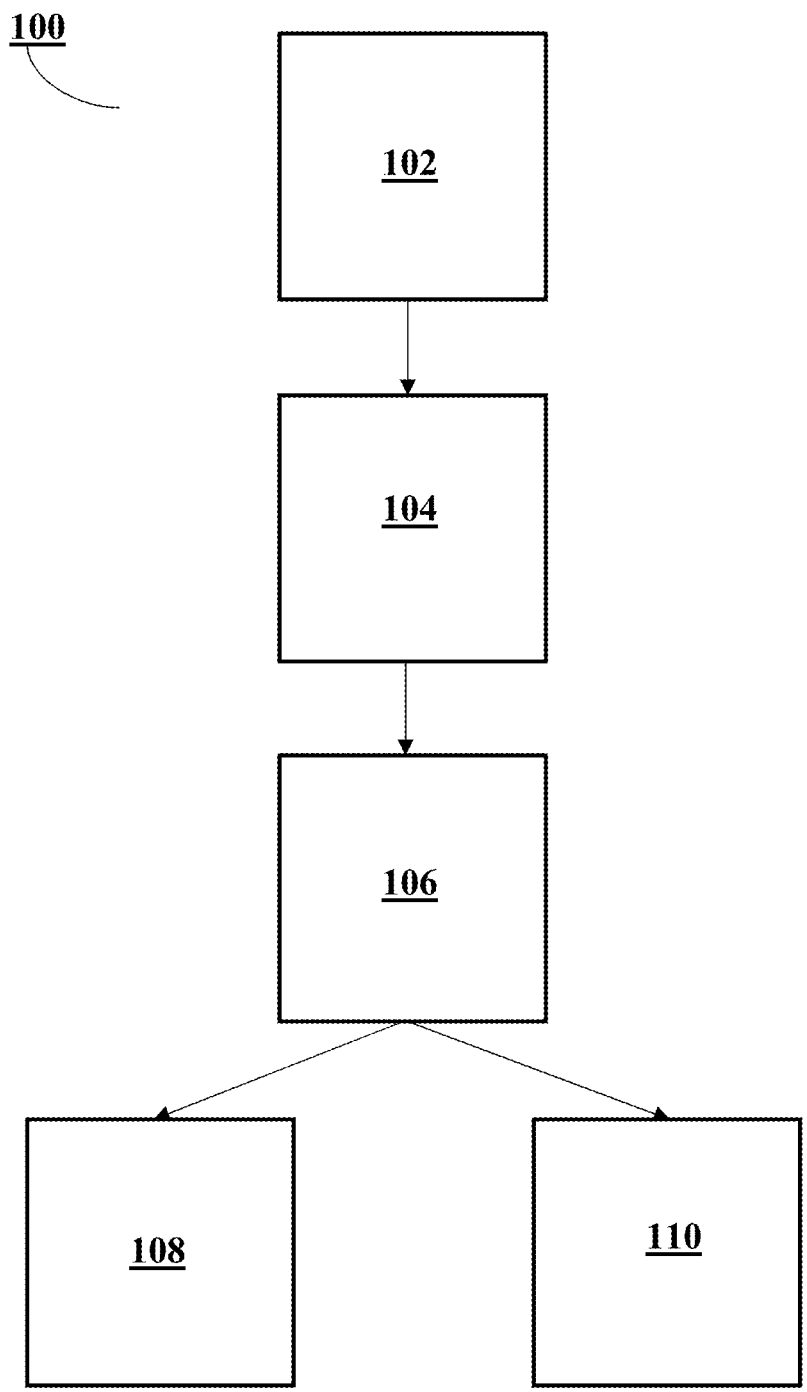
FIG. 1 shows a block diagram of an exemplary account lifecycle management system.

In FIG. 1, an exemplary account lifecycle management (ALM) system 100 is shown. The account lifecycle management system 100 comprises at least a Discovery Engine 102, a Policy Engine 104, a Data Modeling Engine 106, and a Remediation Engine 108. In some embodiments, the system further comprises a Mitigation Engine 110. In some embodiments, the account lifecycle management system 100 is implemented as software instructions executed by a processor and a memory. In some embodiments, the account lifecycle management system 100 is implemented by a network of Internet connected computers having at least one processor and a memory. In some embodiments, Discovery Engine 102, Policy Engine 104, Data Modeling Engine 106, and Remediation Engine 108 are implemented together on the same computer processing system, and in other embodiments, as separate sub-systems configured to communicate over the Internet, an Intranet network, or some other communications network. As used herein, an engine may be implemented in hardware such as a processor in communication with a memory. In some embodiments, an engine may be implemented as software instructions, that when executed by computer hardware, cause the computer to perform steps as dictated by the instructions. Other combinations of hardware and software will be apparent to those of skill in the art.

In some embodiments, Discovery Engine 102 is configured to discover and identify user accounts within an organization. In some embodiments, user accounts are retrieved from sources that feed account and entitlement information and sources that contain information about the account such as ownership and organizational association. In some embodiments, accounts are retrieved from an optimized source list. An optimized source list focuses account retrieval from main account repositories such as KEON (comprehensive Unix security management system), JITOD (comprehensive Wintel security management system), Mainframe/Midrange onboarded to Data Collection Repository (DCR) user tables, and Database user tables. It is appreciated that, in some embodiments, an optimized source list may comprise different account repositories according to user preference. In some embodiments, the sources are read only. In other embodiments, the Discovery Engine 102 is configured to read or write data from a source.

In an exemplary embodiment, there are two different account types identifiable by Discovery Engine 102: Single User accounts and Functional accounts. Single User accounts may be defined by their distinct link to a Security Identifier (SID). For Example, in the context of the Microsoft Windows NT line of operating systems, a Security Identifier (SID) is a unique, immutable identifier of a user, user group, or other security principal. A security principal has a single SID for life (in a given domain), and all properties of the principal, including its name, are associated with the SID. This design allows a principal to be renamed (for example, from "Jane Smith" to "Jane Jones") without affecting the security attributes of objects that refer to the principal.

In contrast to Single User accounts, Functional accounts may be defined by the absence of any link to an SID. In some embodiments, Functional accounts are comprised of Shared Interactive accounts, Application-to-Application accounts, Hybrid accounts, Platform Default accounts, and AD (Active Directory) Primary accounts. Shared Interactive accounts are shared amongst a group of users and used interactively within a host or database. Application-to-Application accounts are not used interactively by a user but rather are used to facilitate application functionality or processing. Application-to-Application accounts may be used within a host or between hosts. Hybrid accounts are used both interactively by a user and to facilitate application functionality. Platform Default accounts are accounts that are pre-generated as part of a default installation of main Operating System/Database packages. Active Directory (AD) Primary accounts are accounts that are linked to a mailbox. After Discovery Engine 102 discovers an account and identifies the type of account, the access levels associated with the account may be identified by Policy Engine 104.

In some embodiments, Policy Engine 104 is configured to identify privileged access data related to an account. In an exemplary embodiment, privilege levels may be described as System Control, Update Data, Appropriate Access, Unvetted Access, and Sensitive Read. In other embodiments, additional and/or alternative privilege levels may be used. A user having System Control privileges can override, modify, or disable technical and security controls. A user having Update Data privileges has the ability to update code, data, database schemas, job-schedules, or other objects that could impact the availability and integrity of the company's production systems. A user having Appropriate Access privileges can verify that a user has correct entitlements based on their job function, where this is not the case, a break is created to highlight the inappropriate access. A user having Unvetted Access privileges has a functional account which may have file level permissions that make them privileged. A user having Sensitive Read privileges has access to view or "read" personal information (PI) and/or other highly confidential data.

In some embodiments, Data Modeling Engine 106 is configured to associate privileged access data with organizational information, such as, but not limited to, applications associated with the account, support team information, and specific privileges for business units. Data Modeling Engine 106 may be further configured to integrate with various systems to provide recommendations based on the likelihood an account is a member of the various business units or has specific privileges.

In some embodiments, Remediation Engine 108 is configured to implement remediation actions to single user or functional accounts as they are identified by Discovery Engine 102. Remediation actions can include, for example, Enterprise Password Vault (EPV) Break-Glass, EPV Application Identity Management (AIM), Disable/Remove, Reduce Privileges, Disable as end state, and Vetted non-privileged. In other embodiments, additional remediation actions are available. When EPV Break-Glass is the appropriate remediation action, the account can be placed under managed Break-Glass, which grants emergency privileges to an account for a limited amount of time. In some embodiments, EPV Break-Glass is only available as a remediation action for shared interactive accounts. When EPV AIM is the appropriate remediation action, the account may be placed into an application-to-application account repository. When Disable/Remove is the appropriate remediation action, the account may be set to be disabled and removed after a validation period. In some embodiments, the validation period is manually set. In other embodiments, the validation period is determined based on account characteristics and/or organizational priority. In some embodiments, the identified account is not capable of deletion, so it disabled as an end state, meaning, it will not have a validation period and will remain disabled.

When Reduce Privileges is the appropriate remediation action, individual privileges (i.e., System Control, Update Data, Appropriate Access, and Sensitive Read) may be removed. In some embodiments, Remediation Engine 208 is configured to determine a specific privilege causing a break and removes that privilege. Vetted non-privileged is the appropriate remediation action when an account is an unvetted account that has no associated privileges. Other remediation actions will be apparent to those of skill in the art.

In some embodiments, the appropriate remediation actions implemented by Remediation Engine 108 are defined by the type of account identified. If an account is identified as a single user account, Remediation Engine 108 may be configured to 1) disable the account with intent to remove the account at a later time (Disable/Remove); 2) Remove privileges from accounts causing breaks (Reduce Privileges); 3) Onboard into EPV Human Readable Accounts (HRA); or, 4) Split the account into a secondary account if needed. EPV Breakglass (BG) is intended for accounts that are shared, whereas EPV Human Readable Accounts (HRA) are intended for accounts that are tied to a single user.

When an account is identified as a shared interactive account, the Remediation Engine 108 may be configured to 1) Disable the account with intent to remove at a later time (Disable/Remove); 2) Remove privileges from accounts causing breaks (Reduce Privileges); or 3) Onboard into EPV Break-Glass as a managed account.

When an account is identified as an application-to-application account, the Remediation Engine 108 may be configured to 1) Disable the account with intent to remove at a later time (Disable/Remove); 2) Remove privileges from accounts causing breaks (Reduce Privileges); or 3) Onboard into EPV AIM as a managed account. In some embodiments, onboarding into the EPV AIM requires agent interaction on the server to make programmatic changes to request access.

When an account is identified as a hybrid account, the Remediation Engine 108 is configured to 1) Disable the account with intent to remove at a later time; 2) Remove privileges from accounts causing breaks; or 3) Split the account into two accounts, one being a shared interactive account, the other being an application-to-application account.

In some embodiments, account lifecycle management system 100 includes a Mitigation Engine 110. Mitigation Engine 110 may be configured to implement mitigation actions to single user or functional accounts as they are identified by Discovery Engine 102. If an account is identified as a single user account, the primary mitigation option for privileged accounts is to have a documented exception with a Technology Control Officer (TCO) and other relevant approvals. In some embodiments, a TCO and an ID/Application owner must agree to an exception that is linked to a Control Self Assessment (CSA), Risk Acceptance, or the like. If an account is identified as a shared interactive account, the primary mitigation option for privileged accounts is to have a documented exception with a TCO and other relevant approvals. If an account is identified as an application-to-application account, mitigation options include monitoring of account usage or a documented exception with a TCO and other relevant approvals. If an account is identified as a hybrid account, mitigation actions include splitting the account into two accounts or a documented exception with a TCO and other relevant approvals.

Figure 2:
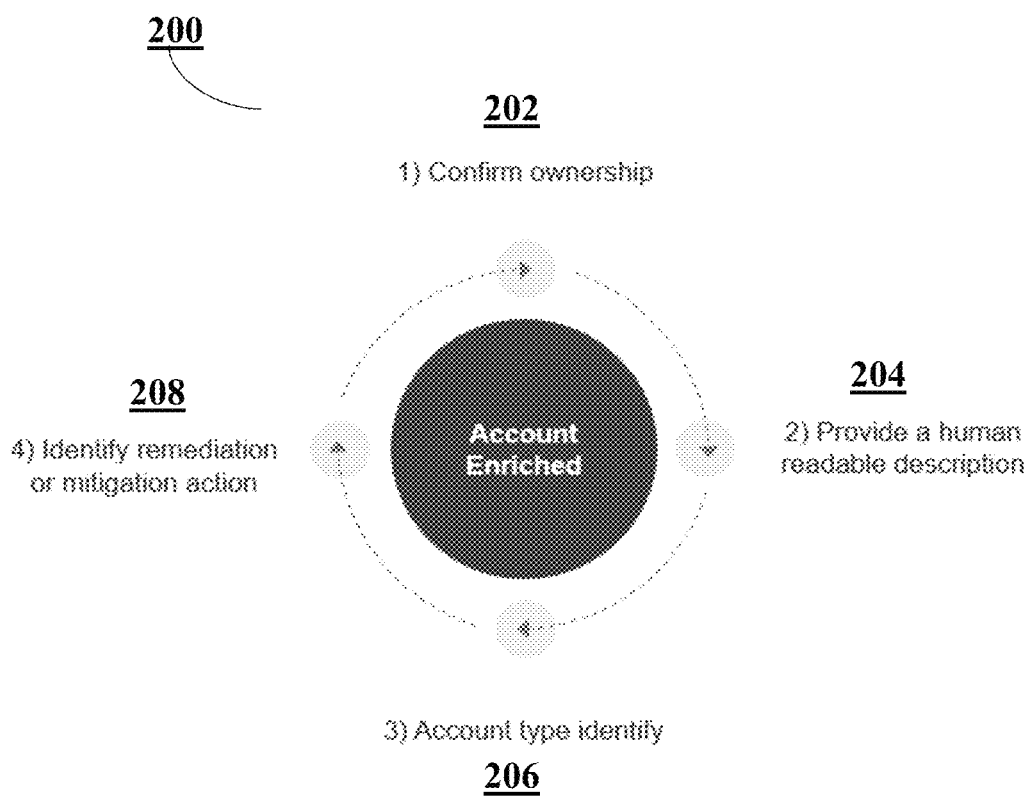
FIG. 2 shows an exemplary account enrichment process.

FIG. 2 shows an exemplary account enrichment process 200. At step 202, an account owner may be determined. Every account must have a confirmed owner. In some embodiments, there are three methods to associate an account with an owner: 1) Owner Validation; 2) Suggested Owner Confirmation; and 3) Missing Owner Validation. In some embodiments, additional methods may be implemented to confirm ownership of an account. Owner Validation can be used to identify an account having an owner found in a Non-Employee Identity Management (NEIM), ID Owner, IDCert or EPV linked to the account. Suggested Owner Confirmation may compile a list of possible owners of an account. In some embodiments, the suggested owner list is compiled based on a calculated likelihood of ownership. This calculation may be based on a number of data points that are discovered by the ALM such as the number of hosts, applications, how often it is used, who last used it, and when it was last used. In some embodiments, the suggested owner list is compiled based on a recommendation from another party within the system. If no owner is found by either the Ownership Validation or Suggested Ownership Confirmation methods, an account can be identified using Missing Owner Validation. Missing Owner Validation may identify possible owners that own applications on the same host, and will link those owners with the account.

At step 204, a human readable description of the account is generated that describes the purpose of the account. Additional reporting may be generated based on keywords to identify common or duplicative accounts.

At step 206, the account type, such as a single user account or functional account, is determined. In certain embodiments, all functional accounts must be categorized as shared interactive, application-to-application, or hybrid.

At step 208, an account remediation or mitigation action is taken. In some embodiments, all accounts are required to have a remediation or mitigation plan to address breaks. This process may be characterized as account enrichment. In certain embodiments the enriched account is fed into the ALM which can configure audit controls and general reporting to drive the reduction of privilege access or help monitor the adoption of the controls.

Figure 3:
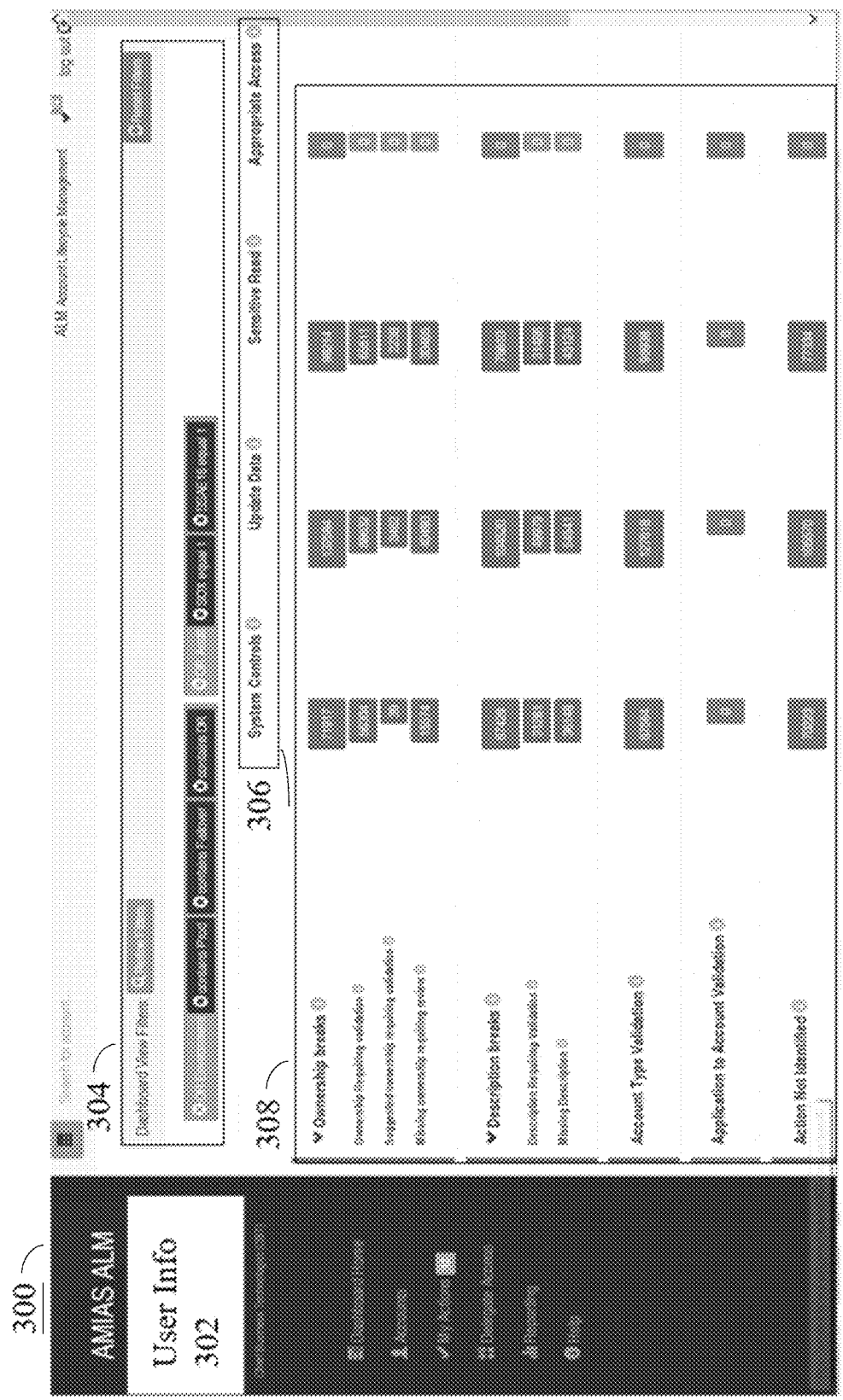
FIG. 3 shows an exemplary user interface for account lifecycle management.

FIG. 3 shows an exemplary user interface implementation of account lifecycle management (ALM), for example system 100. In some embodiments, the user interface is referred to as a dashboard or ALM dashboard, however, the terms may be used interchangeably. In some embodiments, the Dashboard 300 comprises at least User Information 302, Filters 304, Access Level Information 306, and Account Detail Information 308. User Information 302 may comprise details about a user of the ALM dashboard such as name, company ID, or organizational title or role. Additional user information may be display according to system administrator preference. Filters 304 are configured to control the types of analysis conducted by the ALM system. Filters may include, for example, OR environment, contains Prod, contains Failover, Contains DR, OR Audit, SOX equal 1, or SSAE16 equal 1, or Application equal TradeVault, or Application Owner equals Chris, or Region equals ASIAPACIFIC. These and other Filters may vary according to user preference and circumstance. Access Level Information 306 may be configured to provide details related to the access types being analyzed by Dashboard 300. In some embodiments, Account Detail Information 308 includes information about the accounts found by the ALM system, according to the Filters 304 and Access Level Information 306. Account Detail Information 308 may include information such as, for example, Ownership Breaks, Description Breaks, Account Type Validation, Application to Account Validation, and Action Not Identified. These and other types may vary according to user preference and application.

Figure 4:
FIG. 4 shows a view of an exemplary automation workflow.

FIG. 4 shows an exemplary Automation Workflow 400. The workflow ties together the discovered data with the user enriched data and which flows into the reporting and automation to remediate privileged access. Data Sources 402 is an exemplary list of Account, Entitlement, and Context Information Sources used by the ALM system, e.g. system 100. In some embodiments, Data Sources 402 are Read Only, meaning they cannot be modified by the ALM system. In some embodiments, Data Sources are both Read/Write enabled, meaning they may be modified by the ALM system. As remediation or mitigation actions are taken, certain data sources may need an updated assessment of the user profile. Ownership and Account Information 404 shows an exemplary listing of the data sources that need to be updated with account meta-data and remediation/mitigation actions as they are performed on the account. Account Removal 406 shows an exemplary listing of the data sources that need to be updated with account meta-data and remediation/mitigation actions when account removal is an appropriate remediation action. Remove/Reduce Privileges 408 shows an exemplary listing of data sources that need to be updated with account meta-data and remediation/mitigation actions when account removal/reduce privileges is an appropriate remediation action. Onboard into EPV Break-Glass 410 shows an exemplary listing of the data sources that need to be updated with account meta-data and remediation/mitigation actions when onboarding to EPV break-glass is an appropriate remediation action. It is appreciated that the data sources shown in FIG. 4 are non-exhaustive, and can include more or fewer data sources.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

The invention claimed is:

1. A system for managing user access privileges within a computer network, wherein the system comprises at least one processor in communication with a memory, the at least one processor configured to implement:
    a discovery engine configured to discover and identify an existing user account from a source list, the source list comprising a list of at least one account repository that is curated based on a predetermined preference;
    a policy engine configured to identify privileged access data granted to the existing user account, the privileged access data including at least one access privilege level that corresponds to a system control level, an update data level, an appropriate access level, an unvetted access level, and a sensitive read level;
    a data modeling engine configured to:
        determine recommended organizational data to associate with the privileged access data based on a likelihood that the existing user account is associated with a business unit with a corresponding business unit access privilege; and
associate the privileged access data with the recommended organizational data, the recommended organizational data comprising associated application data, support team data, and business unit data; and
a remediation engine configured to modify access privileges of the existing user account.

2. The system of claim 1, wherein the at least one processor is further configured to implement a mitigation engine configured to apply an exception to the modified access privileges of the existing user account.

3. The system of claim 2, wherein the mitigation engine is configured to split the existing user account into multiple new user accounts.

4. The system of claim 1, wherein the discovery engine is configured to identify the existing user account as a single user account or a functional account.

5. The system of claim 4, wherein the existing user account is a single user account associated with a Security Identifier (SID).

6. The system of claim 5, wherein the existing user account is a functional account, wherein the functional account includes a shared interactive account, an application-to-application account, a hybrid account, a platform default account, and an active directory primary account.

7. The system of claim 5, wherein remediation engine is configured to modify access privileges of the existing user account based on the type of functional account identified by the discovery engine.

8. The system of claim 7, wherein the remediation engine is configured to modify access privileges of the existing user account identified as a shared interactive account by: disabling the existing user account, removing the existing user account, reducing privileges of the existing user account, or onboard the existing user account to an Enterprise Password Vault (EPV).

9. The system of claim 7, wherein the remediation engine is configured to modify access privileges of the existing user account identified as a hybrid account by splitting the existing user account into a shared interactive account and an application-to-application account.

10. A computer implemented method for account lifecycle management, the method comprising:
identifying an existing account that is associated with a user from a source list, the source list comprising a list of at least one account repository that is curated based on a predetermined preference;
identifying privileged access data granted to the existing user account, the privileged access data including at least one access privilege level that corresponds to a system control level, an update data level, an appropriate access level, an unvetted access level, and a sensitive read level;
determining recommended organizational information to associate with the privileged access data based on a likelihood that the existing user account is associated with a business unit with a corresponding business unit access privilege;
associating the privileged access data with the recommended organizational information, the recommended organizational information comprising associated application information, support team information, and business unit information; and
modifying access privileges of the existing user account.

11. The method of claim 10, further comprising:
applying an exception to the modified access privileges of the existing user account.

12. The method of claim 11, further comprising:
splitting the existing user account into multiple new user accounts.

13. The method of claim 10, further comprising:
identifying the existing user account as a single user account or a functional account.

14. The method of claim 13, further comprising:
identifying the existing user account as a single user account associated with a Security Identifier (SID).

15. The method of claim 14, further comprising:
identifying the existing user account as a functional account, wherein the functional account includes a shared interactive account, an application-to-application account, a hybrid account, a platform default account, and an active directory primary account.

16. The method of claim 15, further comprising:
modifying access privileges of the existing user account based on the type of functional account identified by the discovery engine.

17. The method of claim 16, further comprising:
modifying access privileges of the existing user account identified as a shared interactive account by: disabling the existing user account, removing the existing user account, reducing privileges of the existing user account, or onboard the existing user account to an Enterprise Password Vault (EPV).

18. The method of claim 16, further comprising:
modifying the access privileges of the existing user account identified as a hybrid account by splitting the existing user account into a shared interactive account and an application-to-application account.

19. The method of claim 10, further comprising:
modifying access privileges of the existing user account based on at least one input received from a dashboard user interface.

20. A non-transitory computer readable medium having instructions stored thereon for executing a method of account lifecycle management, that, when executed by a processor, cause the processor to perform operations comprising:
identifying an existing account that is associated with a user from a source list, the source list comprising a list of at least one account repository that is curated based on a predetermined preference;
identifying privileged access data granted to the existing user account, the privileged access data including at least one access privilege level that corresponds to a system control level, an update data level, an appropriate access level, an unvetted access level, and a sensitive read level;
determining recommended organizational information to associate with the privileged access data based on a likelihood that the existing user account is associated with a business unit with a corresponding business unit access privilege;
associating the privileged access data with the recommended organizational information, the recommended organizational information comprising associated application information, support team information, and business unit information; and
modifying access privileges of the existing user account.

* * * * *